US012592641B2

(12) United States Patent
Chiu et al.

(10) Patent No.: US 12,592,641 B2
(45) Date of Patent: Mar. 31, 2026

(54) BIDIRECTIONAL HIGH VOLTAGE GAIN DC-DC POWER CONVERTER WITH AUTOMATIC CURRENT SHARING FUNCTION

(71) Applicant: National Taiwan University of Science and Technology, Taipei City (TW)

(72) Inventors: Huang-Jen Chiu, New Taipei City (TW); Nhat Truong Phan, Taipei City (TW); Yu-Chen Liu, Taipei City (TW); Anh Dung Nguyen, Hayward, CA (US); Tan Tung Nguyen, Taipei City (TW); Van Quy Le, Taipei City (TW)

(73) Assignee: National Taiwan University of Science and Technology, Taipei City (TW)

( * ) Notice: Subject to any disclaimer, the term of this patent is extended or adjusted under 35 U.S.C. 154(b) by 208 days.

(21) Appl. No.: 18/736,477

(22) Filed: Jun. 6, 2024

(65) Prior Publication Data

US 2025/0286453 A1     Sep. 11, 2025

(30) Foreign Application Priority Data

Mar. 5, 2024     (TW) .................................. 113107810

(51) Int. Cl.
H02M 3/158          (2006.01)
H02M 1/00           (2006.01)

(52) U.S. Cl.
CPC ......... H02M 3/158 (2013.01); H02M 1/0043 (2021.05)

(58) Field of Classification Search
CPC ............................. H02M 3/158; H02M 1/0043
See application file for complete search history.

(56) References Cited

U.S. PATENT DOCUMENTS 10,211,734 B1 *   2/2019   Nguyen ............. H02M 3/1582
12,149,174 B2 *  11/2024   Chen ................... H02M 3/1586
2003/0142513 A1   7/2003   Vinciarelli
2007/0216319 A1 *  9/2007   Wai ..................... H02M 3/1584
                                                                    315/247

(Continued)

FOREIGN PATENT DOCUMENTS

CN          208939828 U     6/2019
CN          110323925 A    10/2019

(Continued)

*Primary Examiner* — Rafael O De Leon Domenech
(74) *Attorney, Agent, or Firm* — Li & Cai Intellectual Property Office

(57)          ABSTRACT

A high-voltage gain DC-DC bidirectional power converter with automatic current sharing function includes first, second, and third switching circuits and a control circuit. The first switching circuit includes a first high-side switch, a second high-side switch and a first low-side switch that are connected to a first voltage source, a first clamping capacitor and a second low-side switch that are connected between the first high-side switch and a first voltage source, and a first inductor. The second switching circuit includes a second inductor and a third high-side switch that are connected between a second voltage source and the first switching circuit, and a third low-side switch. The third switching circuit includes a third inductor, a second clamping capacitor and a fourth high-side switch that are connected between the second voltage source and the first switching circuit, and a fourth low-side switch.

10 Claims, 9 Drawing Sheets

(56) References Cited

U.S. PATENT DOCUMENTS

| 2007/0216390 A1 * | 9/2007 | Wai ........................ | H02M 3/158 |
| | | | 323/351 |
| 2022/0407423 A1 | 12/2022 | Chen et al. | |
| 2023/0020726 A1 * | 1/2023 | Jin ........................ | H02M 1/0095 |

FOREIGN PATENT DOCUMENTS

| CN | 115694190 A | 2/2023 |
| CN | 116155074 A | 5/2023 |

* cited by examiner

BIDIRECTIONAL HIGH VOLTAGE GAIN DC-DC POWER CONVERTER WITH AUTOMATIC CURRENT SHARING FUNCTION

CROSS-REFERENCE TO RELATED PATENT APPLICATION

This application claims the benefit of priority to Taiwan Patent Application No. 113107810, filed on Mar. 5, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a converter, and more particularly to a power converter with automatic current sharing function.

BACKGROUND OF THE DISCLOSURE

In recent years, renewable energies such as solar, wind, and tides have been rapidly deployed to replace fossil fuel energies due to environmental concerns. However, renewable energies cannot be used directly for electronic products due to having intermittent nature. Therefore, energy storage systems (ESSs) such as batteries, and ultra-capacitors are employed to store the energy when the power from renewable energies is high, and ESSs can release the power when the power from renewable energies is low. In this case, bidirectional converters are the best solution to charge and discharge the ESSs with the forward mode and reverse mode, respectively, thereby ensuring the stability of the renewable energy systems. The ESSs demand low output voltage to charge the batteries from the high voltage of the DC bus, thus, the bidirectional converters will have a high voltage gain. Two types of the high voltage-gain bidirectional converters are available: isolated and non-isolated converters.

Isolated converters such as dual-active-bridge (DAB) and resonant converters have been proposed recently. The significant advantage of the isolated converters is the electrical isolation. However, these converters have low power density due to the size of the transformer. The DAB converter has a simple structure; however, the zero-voltage switching (ZVS) range of such converter is limited and the control thereof is complex to achieve the specifications. Accordingly, the resonant converters are preferred due to achieving ZVS in the full range of load. In addition, the resonant converters employ reactive components that cause issues such as having high electromagnetic interference (EMI) and complex control to ensure system stability. However, in the isolated converters, the high circulating current on the transformer, losses of components, and the complicated controller are the important issues that require further research. Moreover, the stability and reliability of the isolated converter to operate bidirectional is another issue due to having complicated control and narrow output voltage range.

The bidirectional buck-boost converter has been the candidate for non-isolated converters in both low-end and medium-end applications. However, this converter cannot adapt to some applications, which demand high input and low output voltages due to the converter having a narrow duty ratio. Thus, the control becomes complex to ensure the system stability since a small variation of the duty ratio can result in a high error of the output voltage. Hence, this will cause significant issues of the battery. Moreover, the voltage stress on switches in bidirectional buck-boost converters is another issue in high voltage applications due to having higher switching loss and costs of components. In addition, certain topologies employing interleaved methods to adapt to higher power applications, has the current balancing issue.

SUMMARY OF THE DISCLOSURE

In response to the above-referenced technical inadequacies, the present disclosure provides a bidirectional power converter having high voltage gain and low voltage stress on switches, and the bidirectional power converter is suitable for bidirectional high voltage gain applications due to the capacitive voltage division.

In order to solve the above-mentioned problems, one of the technical aspects adopted by the present disclosure is to provide a high voltage gain DC-DC bidirectional power converter with an automatic current sharing function that is suitable for bidirectional power supply between a first voltage source and a second voltage source, and the high voltage gain DC-DC bidirectional power converter includes a first switching circuit, a second switching circuit, and a third switching circuit. The first switching circuit includes a first high-side switch, a second high-side switch, and a first low-side switch connected in series between a first end and a second end of the first voltage source, a first clamping capacitor and a second low-side switch connected in series between the first high-side switch and the second end of the first voltage source, and a first inductor. A first end of the first inductor is connected between the second high-side switch and the first low-side switch, and a second end of the first inductor is connected between the first clamping capacitor and the second low-side switch. The second switching circuit includes a second inductor and a third high-side switch that are connected in series between a second voltage source and the first switching circuit, and a third low-side switch. A first end of the third low-side switch is connected between the second inductor and the third high-side switch, and a second end of the third low-side switch is connected to a second end of the second voltage source. The third switching circuit includes a third inductor, a second clamping capacitor, and a fourth high-side switch that are connected in series between the first end of the second voltage source and the first switching circuit, and a fourth low-side switch. The fourth high-side switch is further connected between the second switching circuit and the first switching circuit. A first end of the fourth high-side switch is connected between the third inductor and the second clamping capacitor, and a second end of the fourth high-side switch is connected to the second end of the second voltage source. The control circuit is configured to control the first switching circuit, the second switching circuit and the third switching circuit respectively through a first switch signal, a second switch signal, a third switch signal and a fourth switch signal. The first high-side switch and the third high-side switch correspond to the first switch signal, the second high-side switch and the fourth high-side switch correspond to the second switch signal, the second low-side switch and the third low-side switch correspond to the third switch signal, the first low-side switch and the fourth low-side switch correspond to the fourth switch signal, the first switch signal and the second switch signal differ by a predetermined phase, the first switch signal and the second switch signal are complementary, and the second switch signal and the fourth switch signal are complementary.

In order to solve the above-mentioned problems, another one of the technical aspects adopted by the present disclosure is to provide a high voltage gain DC-DC bidirectional power converter with automatic current sharing function, suitable for bidirectional power supply between a first voltage source and a second voltage source, and the high voltage gain DC-DC bidirectional power converter includes m first switching circuits, a second switching circuit, and n−1 third switching circuits. The m first switching circuits each includes a first high-side switch, a second high-side switch, and a first low-side switch connected in series between a first end and a second end of the first voltage source, a first clamping capacitor and a second low-side switch connected in series between the first high-side switch and the second end of the first voltage source, and a first inductor. A first end of the first inductor is connected between the second high-side switch and the first low-side switch, and a second end of the first inductor is connected between the first clamping capacitor and the second low-side switch. The second switching circuit includes a second inductor and a third high-side switch connected in series between a first end of the second voltage source and the first switching circuit, and a third low-side switch. A first end of the third low-side switch is connected between the second inductor and the third high-side switch, and a second end of the third low-side switch is connected to a second end of the second voltage source. Each of the n−1 third switching circuits includes a third inductor, a second clamping capacitor, and a fourth high-side switch connected in series between the first end of the second voltage source and the first switching circuit. The fourth high-side switch is further connected between the second switching circuit and the m first switching circuits. A first end of the fourth low-side switch is connected between the third inductor and the second clamping capacitor, and a second end of the fourth low-side switch is connected to the second end of the second voltage source. The control circuit is configured to control the first high-side switch and the third high-side switch of each of the first switching circuits through m first switch signals, the second high-side switch of each of the first switching circuit through m second switch signals, the first low-side switch of each of the first switching circuit through m third switch signals, the first low-side switch of each of the first switching circuit through m fourth switch signals, the third high-side switch and the fourth high-side switch of each of the third switching circuit through n fifth switch signals, and the third low-side switch and the fourth low-side switch of each of the third switching circuits through n sixth switch signals.

Therefore, the bidirectional power converter provided by the present disclosure has high voltage gain and low voltage stress on switches, and is suitable for bidirectional high voltage gain applications due to the capacitive voltage division, such as energy storage systems (ESSs), on-board chargers (OBC), information and communication technology (ICT) devices, and data centers. Therefore, low voltage rating switches can be employed to reduce losses and cost.

Furthermore, the bidirectional power converter provided by the present disclosure can achieve automatic and uniform current sharing under the premise of employing the interleaved control method without adding extra components or complex control methods as in the conventional interleaved converters. In addition, an expandable version of the bidirectional power converter provided by the present disclosure can be implemented to extend a conversion ratio, which uses less control signals, has higher effective duty ratios, and uses less number of components comparing to expandable versions of other topologies.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
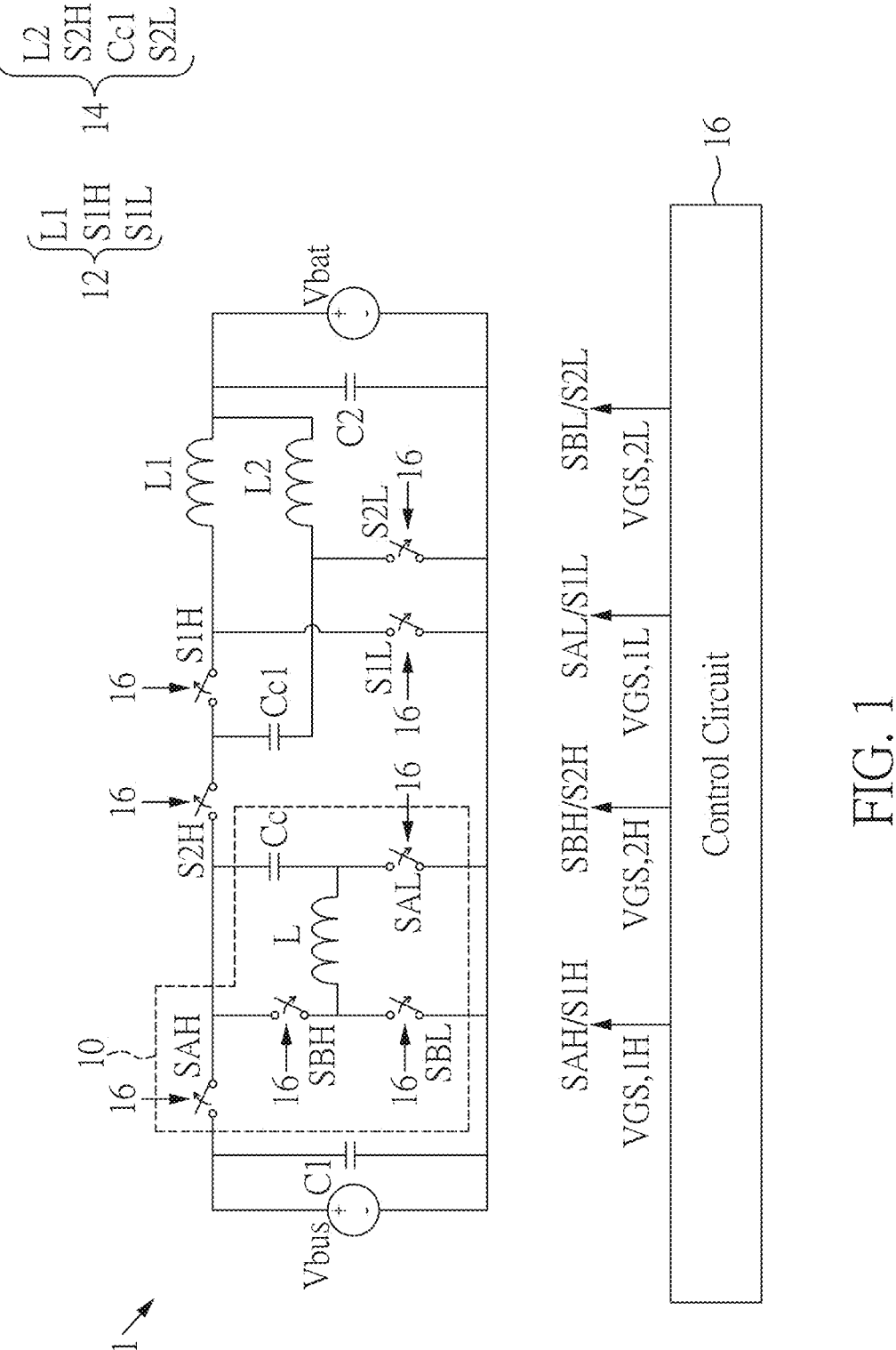
FIG. 1 is a circuit diagram of a bidirectional DC-DC power converter according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure mainly provides a bidirectional converter with high voltage gain and low voltage stress on switches, and the bidirectional converter is suitable for bidirectional high voltage gain applications due to the capacitive voltage division, such as energy storage systems (ESS), on-board chargers (OBC), information and communication technology (ICT) equipment, and data centers. Therefore, low voltage rating switches can be employed to reduce losses and cost. Although the bidirectional power converter provided by the present disclosure employs the interleaved method, automatic and uniform current sharing can be achieved without adding extra components or complex control methods as the conventional interleaved converters. Besides, the expandable versions of the bidirectional power converter provided by the present disclosure can be implemented to extend a conversion ratio, which uses less control signals, has higher effective of duty ratio, and uses less component quantity compared to expandable versions of other topologies.

First Embodiment

FIG. 1 is a circuit diagram of a bidirectional DC-DC power converter according to a first embodiment of the present disclosure. Referring to FIG. 1, the first embodiment of the present disclosure provides a bidirectional DC-DC power converter 1, which is suitable for bidirectional power supply between a first voltage source Vbus and a second voltage source Vbat, such as between a DC bus and an energy storage system (ESS), and thus they are represented by Vbus and Vbat, respectively, and corresponding voltages are Vbus and Vbatt, respectively. A positive end and a negative end of the first voltage source Vbus can be connected to a first end and a second end of an input capacitor C1, respectively. A positive end and a negative end of the second voltage source Vbat can be connected to a first end and a second end of an input capacitor C2, respectively.

The bidirectional DC-DC power converter 1 includes a first switching circuit 10, a second switching circuit 12, a third switching circuit 14, and a control circuit 16. The first switching circuit 10 includes a high-side switch SAH, a high-side switch SBH, and a low-side switch SBL connected in series between the positive end and the negative end of the first voltage source Vbus, a clamping capacitor Cc and a low-side switch SAL connected in series between the high-side switch SAH and the negative end of the first voltage source Vbus, and an inductor L.

Specifically, a first end of the high-side switch SAH is connected to the positive end of the first voltage source Vbus, and a second end of the high-side switch SAH is connected to a first end of the high-side switch SBH and a first end of the clamping capacitor Cc. A second end of the high-side switch SBH is connected to a first end of the inductor L and a first end of the low-side switch SBL. The first end of the inductor L is connected between the high-side switch SBH and the low-side switch SBL, and a second end of the inductor L is connected between a second end of the clamping capacitor Cc and the first end of the low-side switch SAL. In addition, a second end of the low-side switch SBL and a second end of the low-side switch SAL are both connected to the negative end of the first voltage source Vbus.

The second switching circuit 12 is located between the first switching circuit 10 and the second voltage source Vbat, and includes an inductor L1, a high-side switch S1H, and a low-side switch S1L that are connected in series between a positive end of the second voltage source Vbat and the first switching circuit 10. A first end of the inductor L1 is connected to a first end of the high-side switch S1H, and a second end of the inductor L1 is connected to the positive end of the second voltage source Vbat. A first end of the low-side switch S1L is connected between the first end of the inductor L1 and the high-side switch S1H, and a second end of the low-side switch S2L is connected to the negative end of the second voltage source Vbat.

The third switching circuit 14 includes an inductor L2, a clamping capacitor Cc1, a high-side switch S2H connected in series between the positive end of the second voltage source Vbat and the first switching circuit 10, and a low-side switch S2L.

A first end of the inductor L2 is connected to the positive end of the second voltage source Vbat, a first end of the clamping capacitor Cc1 is connected between the high-side switch S2H and the high-side switch S1H, and a second end of the clamping capacitor Cc1 is connected to a second end of the inductor L2. The high-side switch S2H is connected between the second switching circuit 12 and the first switching circuit 10. More precisely, a first end of the high-side switch S2H is connected to the first end of the high-side switch S1H, and a second end of the high-side switch S2H is connected to the second end of the high-side switch SAH, the second end of the high-side switch SBH, and the first end of the clamping capacitor Cc. On the other hand, a first end of the low-side switch S2L is connected between the inductor L2 and the clamping capacitor Cc1, and a second end of the low-side switch S2L is connected to the negative end of the second voltage source Vbat.

The control circuit 16 can control the first switching circuit 10, the second switching circuit 12, and the third switching circuit 14 respectively through a switch signal VGS,1H, a switch signal VGS,2H, a switch signal VGS,1L, and a switch signal VGS,2L.

The high-side switch SAH and the high-side switch S1H correspond to the switch signal VGS,1H, that is, the switch signal VGS,1H will control the high-side switches SAH and S1H. The high-side switch SBH and the high-side switch S2H correspond to the switch signal VGS,2H, that is, the switch signal VGS,2H will control the high-side switches SBH and S2H. The low-side switch SAL and the low-side switch S1L correspond to the switch signal VGS,1L, and the low-side switch SBL and the low-side switch S2L correspond to the switch signal VGS,2L. That is, the low-side switches SAL and S1L are controlled by the control signal VGS,1L, and the low-side switches SBL and S2L are controlled by the control signal VGS,2L.

In addition, a duty ratio and a switching period of the high-side switches SAH, SBH, S1H, and S2H are represented by D and Ts, respectively. The switch signal VGS,1H is shifted by a predetermined phase relative to the switch signal VGS,2H. In this embodiment, the predetermined phase is 180 degrees.

Figure 2A:
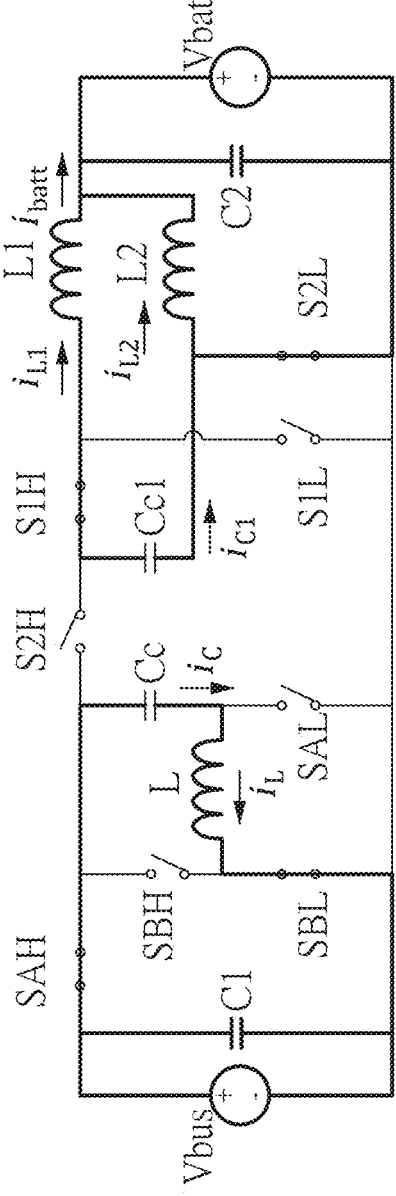
FIG. 2A shows a schematic diagram of current flow paths of the bidirectional DC-DC power converter in a first mode (time t0 to t1) according to one embodiment of the present disclosure.
Figure 2B:
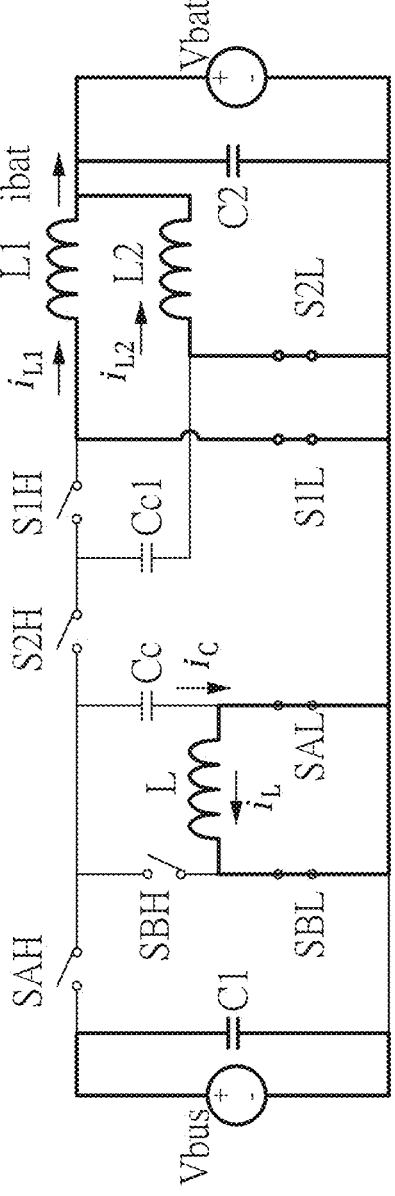
FIG. 2B shows a schematic diagram of current flow paths of the bidirectional DC-DC power converter in a second mode (time t1 to t2) and a fourth mode (time t3 to t4) according to one embodiment of the present disclosure.
Figure 2C:
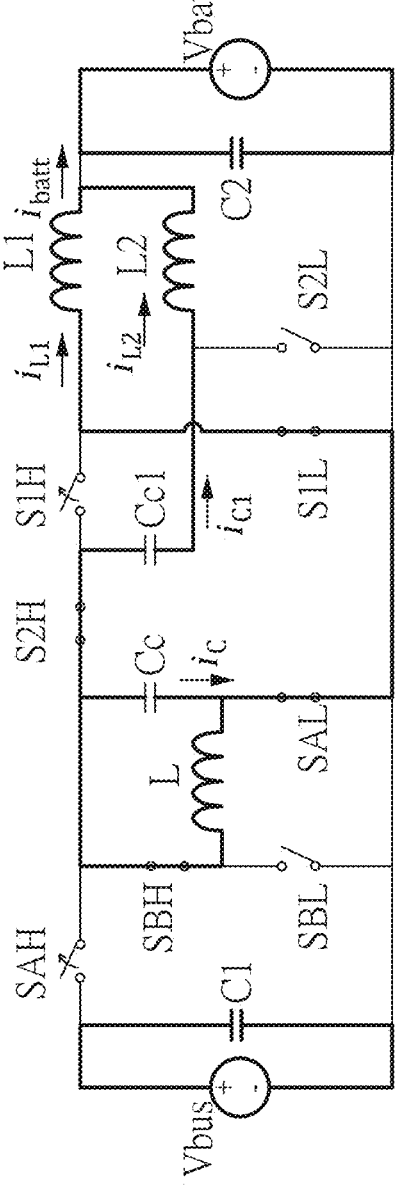
FIG. 2C shows a schematic diagram of current flow paths of the bidirectional DC-DC power converter in a third mode (time t2 to t3) according to one embodiment of the present disclosure.
Figure 3A:
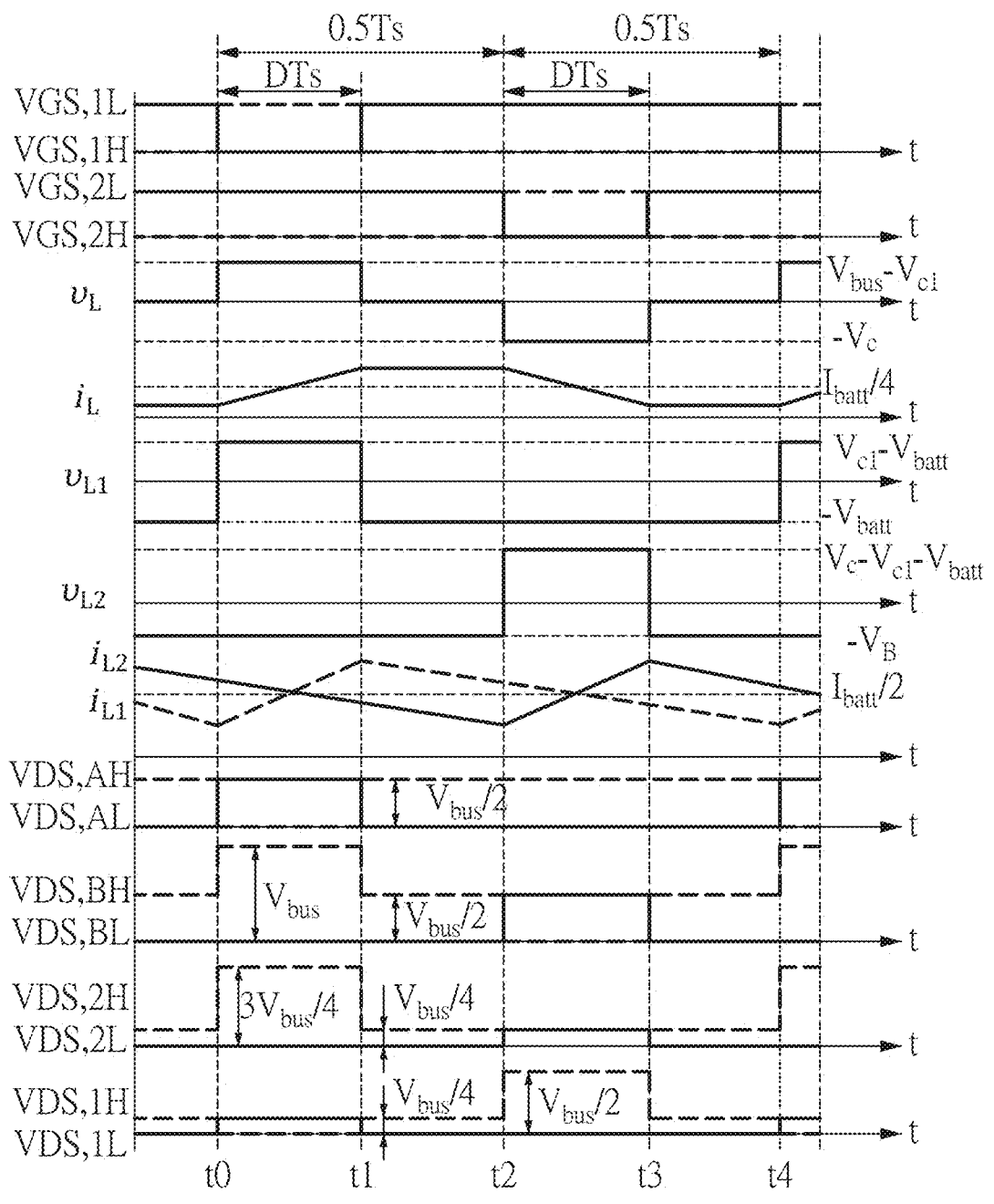
FIG. 3A is a signal timing diagram of waveforms of switch signals, inductor voltages, inductor currents, and voltage stresses of all switching elements in a forward mode in the bidirectional DC-DC power converter according to one embodiment of the present disclosure.
Figure 3B:
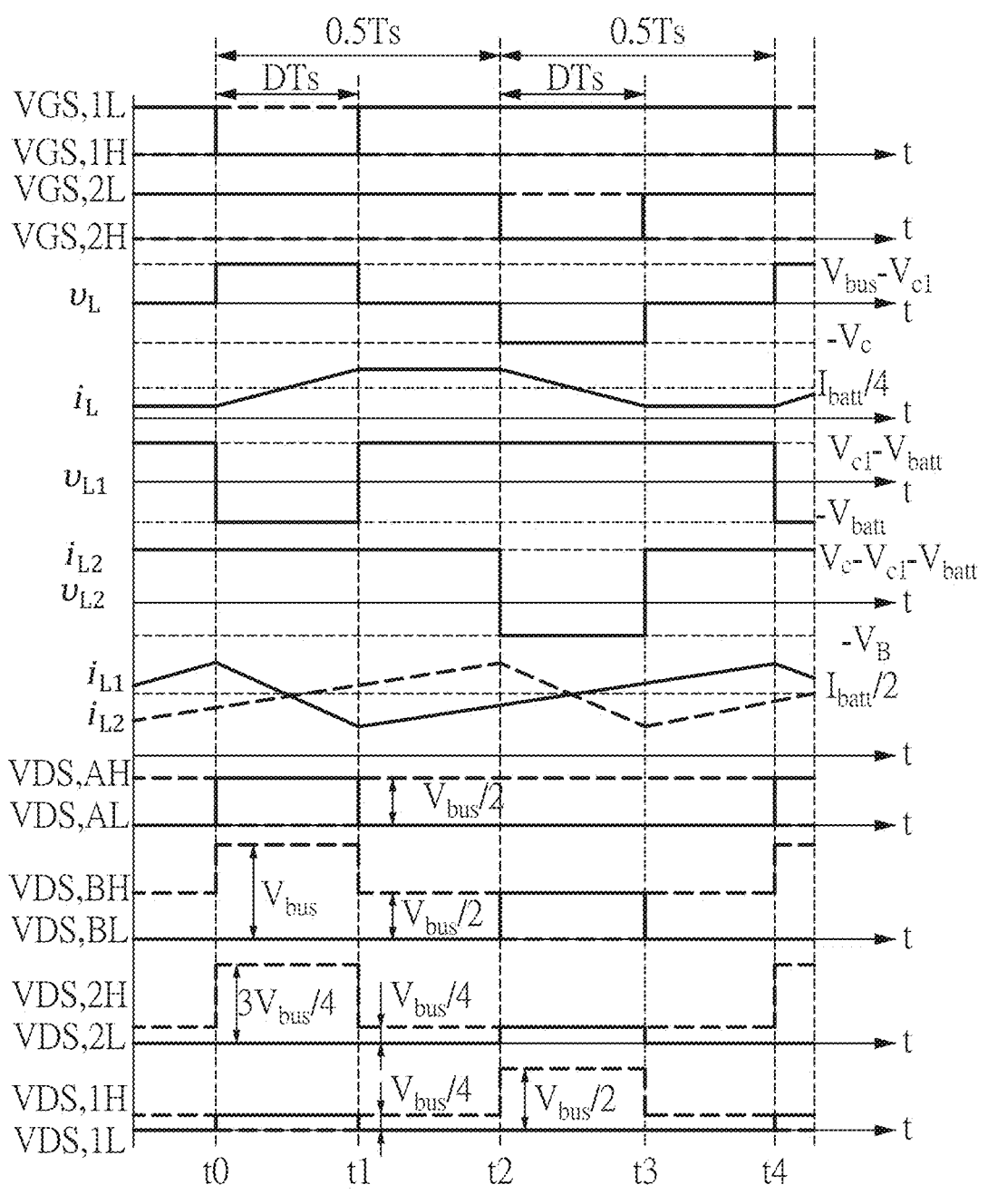
FIG. 3B is a signal timing diagram of waveforms of switch signals of all switching elements, inductor voltages, inductor currents, and voltage stresses of all switching elements in a reverse mode in the bidirectional DC-DC power converter according to one embodiment of the present disclosure.

In the embodiment of the present disclosure, the bidirectional DC-DC power converter 1 provided in FIG. 1 has four operating modes. FIG. 2A shows a schematic diagram of current flow paths of the bidirectional DC-DC power converter in a first mode (time t0 to t1) according to one embodiment of the present disclosure, FIG. 2B shows a schematic diagram of current flow paths of the bidirectional DC-DC power converter in a second mode (time t1 to t2) and a fourth mode (time t3 to t4) according to one embodiment of the present disclosure, FIG. 2C shows a schematic diagram of current flow paths of the bidirectional DC-DC power converter in a third mode (time t2 to t3) according to one embodiment of the present disclosure, FIG. 3A is a signal timing diagram of waveforms of switch signals, inductor voltages, inductor currents, and voltage stresses of all switching elements in a forward mode in the bidirectional DC-DC power converter according to one embodiment of the present disclosure, and FIG. 3B is a signal timing diagram of waveforms of switch signals of all switching elements, inductor voltages, inductor currents, and voltage stresses of all switching elements in a reverse mode in the bidirectional DC-DC power converter according to one embodiment of the present disclosure.

Reference is made to FIGS. 2A, 2B, 2C, and 3A at the same time. In the first mode (time t0 to t1), the control circuit 16 controls the high-side switches SAH and S1H to be turned on, the high-side switches SBH and S2H to be turned off, the low-side switches SAL and S1L to be turned off, and the low-side switches SBL and S2L to be turned on. Applied voltages $v_L$, $v_{L1}$, and $v_{L2}$ of the inductors L, L1, and L2 can be expressed by the following equations:

$$\begin{cases} v_L = V_{bus} - V_c \\ v_{L1} = V_{c1} - V_{batt} \; ; \\ \quad v_{L2} = -V_{batt} \end{cases}$$

in which $V_c$ and $V_{c1}$ are voltages across the clamping capacitors Cc and Cc1, respectively.

Currents $i_c$ and $i_{c1}$ passing through the clamping capacitors Cc and Cc1 can be expressed by the following equations:

$$\begin{cases} i_c = i_L \\ i_{c1} = -i_{L1} \end{cases} ;$$

in the second mode (time t1 to t2), the control circuit 16 controls the high-side switches SAH and S1H to be turned off, the high-side switches SBH and S2H to be turned off, the low-side switches SAL and S1L to be turned on, and the low-side switches SBL and S2L to be turned on.

The state of the switches are shown in FIG. 2B. The currents $i_c$ and $i_{c1}$ passing through the clamping capacitors Cc and Cc1 are zero. The applied voltages $v_L$, $v_{L1}$, and $v_{L2}$ of the inductors L, L1, and L2 can be expressed as:

$$\begin{cases} v_L = 0 \\ v_{L1} = -V_{batt} \; ; \\ v_{L2} = -V_{batt} \end{cases}$$

in the third mode (time t2 to t3), the control circuit 16 controls the high-side switches SAH and S1H to be turned off, the high-side switches SBH and S2H to be turned on, the low-side switches SAL and S1L to be turned on, and the low-side switches SBL and S2L to be turned off.

The applied voltages $v_L$, $v_{L1}$, and $v_{L2}$ of the inductors L, L1, and L2 can be expressed as:

$$\begin{cases} v_L = -V_c \\ v_{L1} = -V_{batt} \quad ; \\ v_{L2} = V_c - V_{c1} - V_{batt} \end{cases}$$

the currents $i_c$ and $i_{c1}$ passing through the clamping capacitors Cc and Cc1 can be expressed as:

$$\begin{cases} i_c = i_L - i_{L2} \\ i_{c1} = -i_{L2} \end{cases} ;$$

in the fourth mode (time t3 to t4), similar to the second mode, the control circuit 16 controls the high-side switches SAH and S1H to be turned off, the high-side switches SBH and S2H to be turned off, the low-side switches SAL and S1L to be turned on, and the low-side switches SBL and S2L to be turned on.

The volt-second balance is applied for the inductors L, L1, and L2 in one period as below:

$$\begin{cases} v_L|_{T_s} = DT(V_{bus} - V_c) + DT(-V_c) = 0 \\ v_{L1}|_{T_s} = DT(V_{c1} - V_{batt}) + 2\left(\dfrac{1}{2} - D\right)T(-V_{batt}) + DT(-V_{batt}) = 0 \\ v_{L2}|_{T_s} = DT(-V_{batt}) + 2\left(\dfrac{1}{2} - D\right)T(-V_{batt}) + DT(V_c - V_{c1} - V_{batt}) = 0 \end{cases} ;$$

therefore, a voltage gain and the voltages of the clamping capacitors can be derived as:

$$\begin{cases} V_c = \dfrac{V_{bus}}{2} \\ V_{c1} = \dfrac{V_{bus}}{4} \\ \dfrac{V_{batt}}{V_{bus}} = \dfrac{D}{4} \end{cases} .$$

The ampere-second balance is applied for the clamping capacitors Cc and Cc1 in one period as below:

$$\begin{cases} i_c = C_c \dfrac{dV_c}{dt}\Big|_{T_s} = DT_s(I_L) + DT_s(I_L - I_{L2}) = 0 \\ i_{c1} = C_{c1} \dfrac{dV_{c1}}{dt}\Big|_{T_s} = DT_s(-I_{L1}) + DT_s(I_{L2}) = 0 \end{cases} ;$$

therefore, the inductor currents $I_L$, $I_{L1}$ and $I_{L2}$ of the high voltage gain converter provided by the present disclosure can be derived as follows:

$$\begin{cases} I_L = \dfrac{I_{L2}}{2} = \dfrac{I_{batt}}{4} \\ I_{L1} = I_{L2} = \dfrac{I_{batt}}{2} \end{cases} ;$$

in which $I_{batt}$ is a current passing through the second voltage source Vbat.

In a forward mode, the control circuit 16 can sequentially enter the first mode, the second mode, the third mode, and the fourth mode. As shown in FIG. 3B, the operation of a reverse mode is similar to that of the forward mode, and will not be reiterated herein.

In addition, the voltage stresses of all high-side switches SAH, SBH, S1H, and S2H, and low-side switches SAL, SBL, S1L, and S2L can be obtained according to the (drain-source) voltages VDS,AH, VDS,BH, VDS,1H, VDS, 2H, VDS,AL, VDS,BL, VDS,1L, and VDS,2L as shown in FIG. 3A, in which the voltage stresses of the high-side switch SAH and the low-side switch SAL and SBL are equal to Vbus/2, and the voltage stresses of the low-side switches S1L, S2L, and SBL are equal to Vbus/4. During the turn-on and turn-off durations, the voltage stresses of the high-side switch SBH and the low-side switches S1L and S2L are equal to Vbus/2 and Vbus/4, respectively. Therefore, low voltage rating switches can be employed and losses of these switches are not significant compared to the conventional buck converters.

Accordingly, the bidirectional DC-DC power converter 1 provided by the present disclosure can achieve a very high voltage gain, and an effective duty cycle can reach 0.5. In addition, the currents $I_{L1}$ and $I_{L2}$ passing through the inductors L1 and L2 may be equal to each other, and are respectively ½ of the current $I_L$ of the inductor L. In other words, the bidirectional DC-DC power converter 1 provided by the present disclosure has the function of automatic current sharing without using additional control mechanisms.

Second Embodiment

In order to achieve higher voltage gain to meet the requirements of higher voltage gain applications, the present disclosure further provides a bidirectional power converter with an automatic current sharing function, which is essentially an expandable version of the bidirectional DC-DC power converter 1 of the first embodiment.

Figure 4:
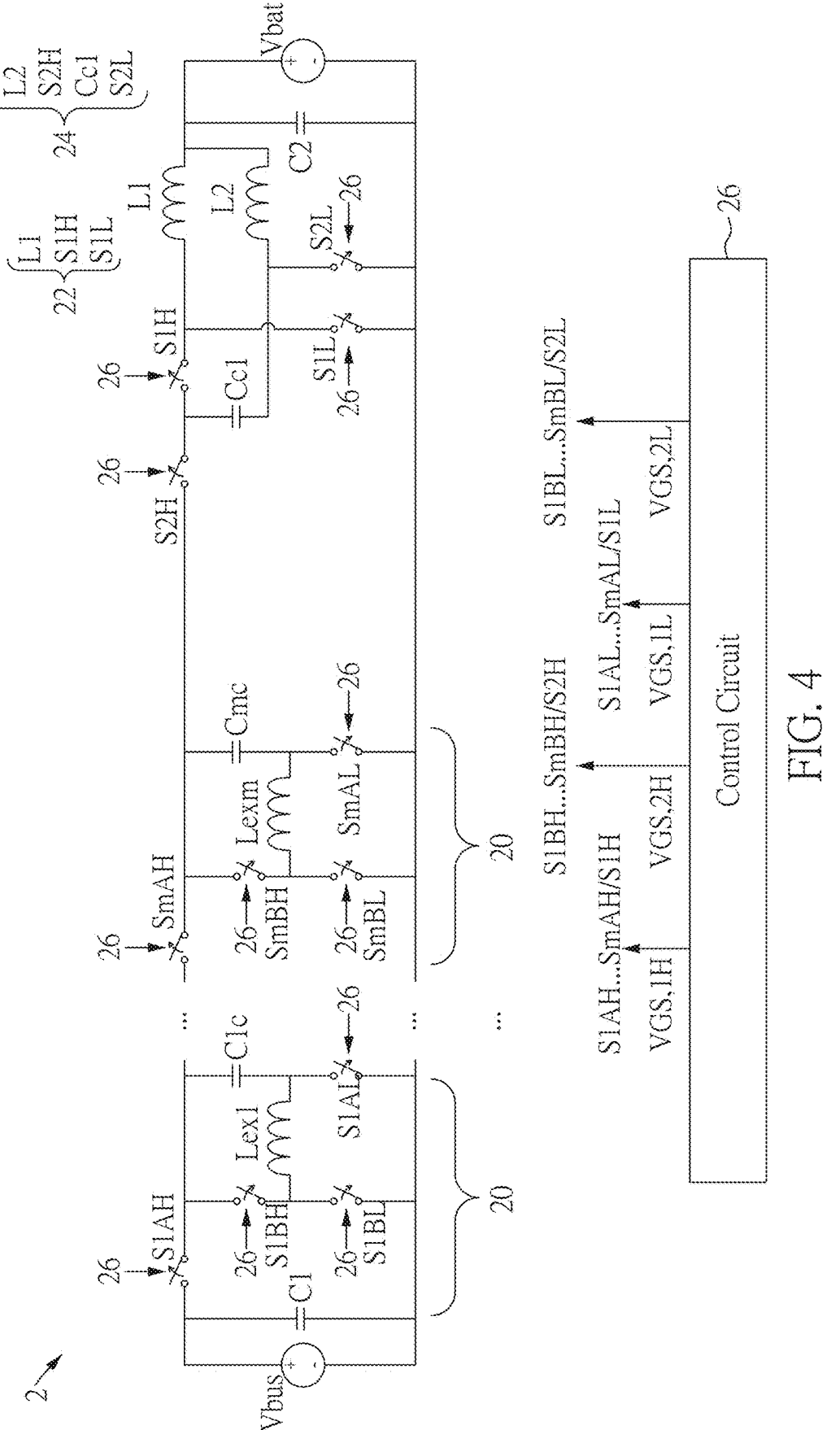
FIG. 4 is a circuit diagram of a bidirectional DC-DC power converter according to a second embodiment of the present disclosure.

FIG. 4 is a circuit diagram of a bidirectional DC-DC power converter according to a second embodiment of the present disclosure. Reference is made to FIG. 4, in which the second embodiment of the present disclosure provides a bidirectional DC-DC power converter 2 suitable for bidirectional power supply between the first voltage source Vbus and the second voltage source Vbat. The bidirectional DC-DC bidirectional power converter 2 includes m first switching circuits 20, a second switching circuit 22, a third switching circuit 24, and a control circuit 26. It should be noted that, according to FIG. 1, each of the m first switching circuits basically includes the high-side switches SAH and SBH, the low-side switches SBL and SAL, the clamping capacitor Cc, and the inductor L of the first embodiment.

In this case, m is a positive integer greater than or equal to 1. When m is greater than or equal to 2, the m first switching circuits 20 are connected in series between the first voltage source Vbus and the second switching circuit 22 in sequence. In this case, among two adjacent first switching circuits 20, the first end of the high-side switch SAH of the second first switching circuit 20 is connected to the second end of the previous (first) one of the high-side switch SAH, which also indicates that the first end of the high-side switch SAH of the second first switching circuit 20 is connected to the first end of the previous (first) one of the high-side switch SBH and the first end of the clamping capacitor Cc. The second end of the high-side switch SAH, the first end of the high-side switch SBH, and the first end of the clamping capacitor Cc of the last one of the m first switching circuits 20 are connected to the second end of the high-side switch S2H.

Therefore, for FIG. 4 of the second embodiment, the first one of the m first switching circuits 20 includes high-side switches S1AH, S1BH, low-side switches S1BL, S1AL, a clamping capacitor C1c, and an inductor Lex1; and the last one of the m first switching circuits 20 includes high-side switches SmAH, SmBH, low-side switches SmBL, SmAL, a clamping capacitor Cmc, and an inductor Lexm.

The second switching circuit 22 is located between the m-th first switching circuit 20 and the second voltage source Vbat, and includes an inductor L1, a high-side switch S1H, and a low-side switch S1L connected in series between the positive end of the second voltage source Vbat and the m-th first switching circuit 20. A first end of the inductor L1 is connected to a first end of the high-side switch S1H, and a second end of the inductor L1 is connected to the positive end of the second voltage source Vbat. A first end of the low-side switch S1L is connected between the first end of the inductor L1 and the high-side switch S1H, and a second end of the low-side switch S2L is connected to the negative end of the second voltage source Vbat.

The third switching circuit 24 includes an inductor L2, a clamping capacitor Cc1, a high-side switch S2H, and a low-side switch S2L connected in series between the positive end of the second voltage source Vbat and the m-th first switching circuit 20.

Switching signals of high-side switches SjAH, SjBH, SjAL, and SjBL (j represents an j-th one, and j is from 1 to m) in each of the first switching circuits 20 are similar to the steady-state analysis in the first embodiment. Moreover, switch signals of the high-side switches SjAH and SjBH in the odd-numbered (1st, 3rd, 5th, . . . ) first switching circuits 20 need to respectively follow switch signals of the high-side switches SjBH and SjAH in the even-numbered (2nd, 4th, 6th, . . . ) first switching circuits 20. In addition, switch signals of the high-side switches S1H and S2H need to follow switch signals of SmBH and SmAH, respectively.

Therefore, currents of the inductors Lexm, L1, and L2 can be expressed by the following equations:

$$I_{Lexm} = \frac{I_{batt}}{2^{m-j+2}}, \; I_{L1} = I_{L2} = \frac{I_{batt}}{2};$$

a voltage of the clamping capacitor Cjc can be expressed by the following equations:

$$V_{cj} = \frac{V_{in}}{2^j}, \; V_{c1} = \frac{V_{cmc}}{2}, \; j = 1 \text{ to } m;$$

a voltage gain of the m-level bidirectional DC-DC power converter 2 provided by the present disclosure can be expressed by the following equation:

$$\frac{V_{batt}}{V_{bus}} = \frac{D}{2^{m+1}};$$

by utilizing the bidirectional DC-DC power converter 2 proposed in the second embodiment of the present disclosure, a higher voltage gain can be achieved, and the effective duty cycle can still be equal to 0.5. Therefore, the bidirectional DC-DC power converter 2 proposed in the second embodiment does not affect the effective duty cycle. However, the load can only be shared between the inductors L1 and L2. Therefore, the bidirectional DC-DC power converter 2 proposed in the second embodiment of the present disclosure can be suitable for applications requiring very high voltage gain and low/medium power.

When the plurality of first switching circuits 20 are connected in series, the switches in the first one of the first switching circuits 20 have the highest voltage stress, and the voltage stresses on the switches are decreased as the number of stages increases. Therefore, the voltage stresses of the high-side switches S1H and S2H and the low-side switches S1L and S2L can be significantly reduced.

Specifically, the voltage stress of all switches can be represented by the following equations:

$$v_{j,AH} = \left((V_{c,ex,j-1} - V_{c,ex,j})\overline{S_{j-1,AH}} + (V_{c,j-2} - V_{c,j})S_{j-1,AH}\right)\overline{S_{j,AH}};$$

$$v_{j,BH} = \left(V_{c,ex,j}\overline{S_{j,AH}} + V_{c,ex,j-1}S_{j,AH}\right)\overline{S_{J,BH}};$$

$$v_{j,AL} = (V_{c,ex,j-1} - V_{c,ex,j})\overline{S_{j,AL}};$$

$$v_{j,BL} = V_{c,ex,j}\overline{S_{j,BL}};$$

$$v_{1H} = \left(V_{c,ex,m}S_{2H} + V_{c1}\overline{S_{2H}}\right)\overline{S_{1H}};$$

$$v_{1L} = V_{c,1}\overline{S_{1L}};$$

$$v_{2H} = \left(V_{c,ex,m-1}S_{1H} + V_{c1}\overline{S_{1H}}\right)\overline{S_{2H}};\ \text{and}$$

$$v_{2L} = (V_{c,ex,m} - V_{c1})\overline{S_{2L}};$$

where $\overline{S_x}$ or $S_x$ corresponds to 0 or 1, which indicates that the status of each of the switches is OFF or ON, respectively, x is switch indicator, the status of $S_{1H,0}$ is 0, and $V_{c,ex,0} = V_{bus}$.

Third Embodiment

In order to achieve higher voltage gain to meet the requirements of higher voltage gain applications, the present disclosure further provides a bidirectional power converter with an automatic current sharing function, which is basically another expandable version of the bidirectional DC-DC power converter 1 of the first embodiment.

Figure 5:
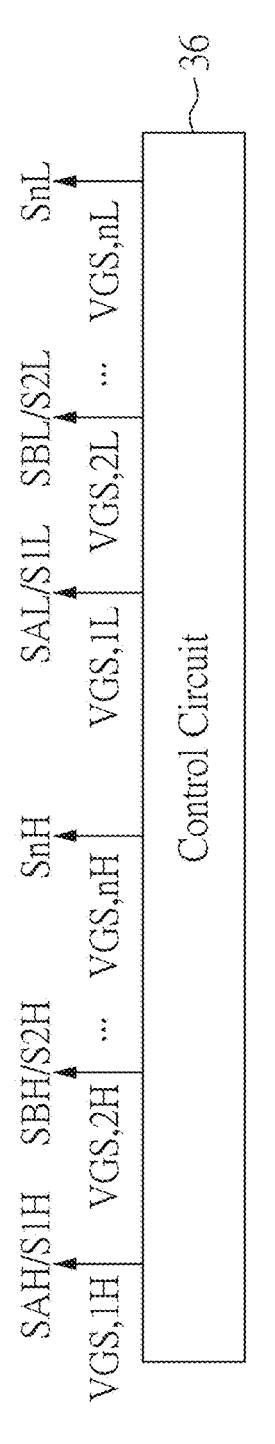
FIG. 5 is a circuit diagram of a bidirectional DC-DC power converter according to a third embodiment of the present disclosure.

FIG. 5 is a circuit diagram of a bidirectional DC-DC power converter according to a third embodiment of the present disclosure. Reference is made to FIG. 5, in which the third embodiment of the present disclosure provides a bidirectional DC-DC power converter 3 suitable for bidirectional power supply between the first voltage source Vbus and the second voltage source Vbat.

In this embodiment, the bidirectional DC-DC power converter 3 includes a first switching circuit 30, a second switching circuit 32, and n−1 third switching circuits 34. It should be noted that, referring to FIG. 1, each of the n−1 third switching circuits 34 basically includes the inductor L2, the clamping capacitor Cc1, the high-side switch S2H, and the low-side switch S2L of the first embodiment. That is, each of the third switching circuits 34 is a three-port circuit. Therefore, n is a positive integer greater than or equal to 2. When n is greater than or equal to 3, the n−1 third switching circuits 34 are connected in sequence. In detail, first ends of all the inductors L2 in the n−1 third switching circuits 34 are connected to one another, and second ends of all the low-side switches S2L are connected to one another. In addition, among two adjacent third switching circuits 34, the first end of the clamping capacitor Cc1 of the second third switching circuit 34 is connected to the second end of the high-side switch S2H of the first one of the third switching circuits 34, and so on. The second end of the high-side switch S2H of the last one of the n−1 third switching circuits 34 is connected to the first end of the high-side switch SAH, the first end of the high-side switch SBH, and the first end of the clamping capacitor Cc.

Therefore, for FIG. 5 of the third embodiment, the first one of the n−1 third switching circuits 34 includes the inductor L2, the clamping capacitor Cc1, the high-side switch S2H, and the low-side switch S2L; and the last one of the n−1 third switching circuit 34 includes an inductor Ln, a clamping capacitor Ccn−1, a high-side switch SnH, and a low-side switch SnL.

In this embodiment, the configurations of the first switching circuit 30 and the second switching circuit 32 are basically similar to the configurations of the first switching circuit 10 and the second switching circuit 12 of the first embodiment, and will not be reiterated herein.

In the embodiment of FIG. 5, the bidirectional DC-DC bidirectional power converter 3 has n phases operating in an interleaved manner. Similar to the previous embodiments, the duty cycle and switching period of the high-side switch are denoted as D and Ts, respectively. A total of n fifth switch signals are utilized, the n fifth switch signals include, for example, switch signals VGS,1H, VGS,2H, . . . , and VGS,nH, and the switch signals are phase shifted from one another by 360/(phase number n). The switch signal VGS, 1H controls the high-side switch S1H, the switch signal VGS,2H controls the high-side switch S2H, and so on; the switch signal VGS,nH controls the high-side switch SnH.

In addition, low-side switches S1L, S2L, . . . , and SnL operate complementarily to the high-side switches S1H, S2H, . . . , and SnH respectively. Therefore, n sixth switch signals can be used to control the low-side switches S1L, S2L, . . . , and SnL, respectively, and the n fifth switch signals are complementary to n sixth switch signals, respectively. In addition, the high-side switches SAH, SBH and low-side switches SAL, SBL of the first switching circuit 30 use the same control signals as the high-side switches S1H, S2H and low-side switches S1L, S2L, respectively; that is, the switch signal VGS,1H is also used to control the high-side switch SAH, the switch signal VGS,2H is also used to control the high-side switch SBH, and so on.

Therefore, average currents of the inductors L1, L2, . . . , and Ln can be expressed by the following equations:

$$I_L = \frac{I_{batt}}{2n}; I_{L,i} = \frac{I_{batt}}{n},$$

voltages of the clamping capacitors Cc1 to Ccn−1 can be expressed by the following equations:

$$V_c = \frac{V_{bus}}{2}; \; V_{c,i} = \frac{i}{n} V_c,$$

therefore, the voltage gain of the n-phase bidirectional DC-DC bidirectional power converter 3 provided by the present disclosure can be expressed by the following equation:

$$\frac{V_{batt}}{V_{bus}} = \frac{D}{2n};$$

Therefore, the bidirectional DC-DC bidirectional power converter 3 provided in the third embodiment can achieve higher voltage gain and share the load for the inductors L1, L2, . . . , and Ln, while remaining the automatic uniform current balancing characteristic. Therefore, the bidirectional DC-DC bidirectional power converter 3 provided in the third embodiment can be suitable for high power applications.

In more detail, when more phases are employed, the voltage stresses of the switches are further reduced, and a higher voltage gain can be achieved. The bidirectional DC-DC bidirectional power converter 3 provided in the third embodiment has more phases for current sharing for being adapted to the higher voltage gain applications.

Specifically, the voltage stress of all switches can be represented by the following equations:

$$v_{SAH} = (V_{bus} - V_c)\overline{S_{AH}};$$

$$v_{SAL} = (V_{bus} - V_c)\overline{S_{AL}};$$

$$v_{SBH} = (V_{bus}S_{AH} + V_c\overline{S_{AH}})\overline{S_{BH}};$$

$$V_{SBL} = V_c\overline{S_{BL}};$$

$$v_{i,H} = ((V_{c,1} - V_{c,i-1})\overline{S_{i+1,H}} - (V_{c,i+1} - V_{c,i-1})S_{i+1,H})\overline{S_{i,H}}; \text{ and}$$

$$v_{i,L} = (V_{c,i} + V_{c,i-1})\overline{S_{i,L}};$$

where $\overline{S_x}$ or $S_x$ corresponds to 0 or 1, which indicates that the status of each of the switches is OFF or ON, respectively, x is switch indicator, the status of switch $S_{n+1,H}$ is similar to switch $S_{1H}$, $V_{c,0}$=0V, $V_{c,n}$=$V_c$, and $V_{c,n+1}$=bus.

Fourth Embodiment

In order to achieve higher voltage gain to meet the requirements of higher voltage gain applications, the present disclosure further provides a bidirectional power converter with an automatic current sharing function, which is basically yet another expandable version of the bidirectional DC-DC power converter 1 of the first embodiment.

Figure 6:
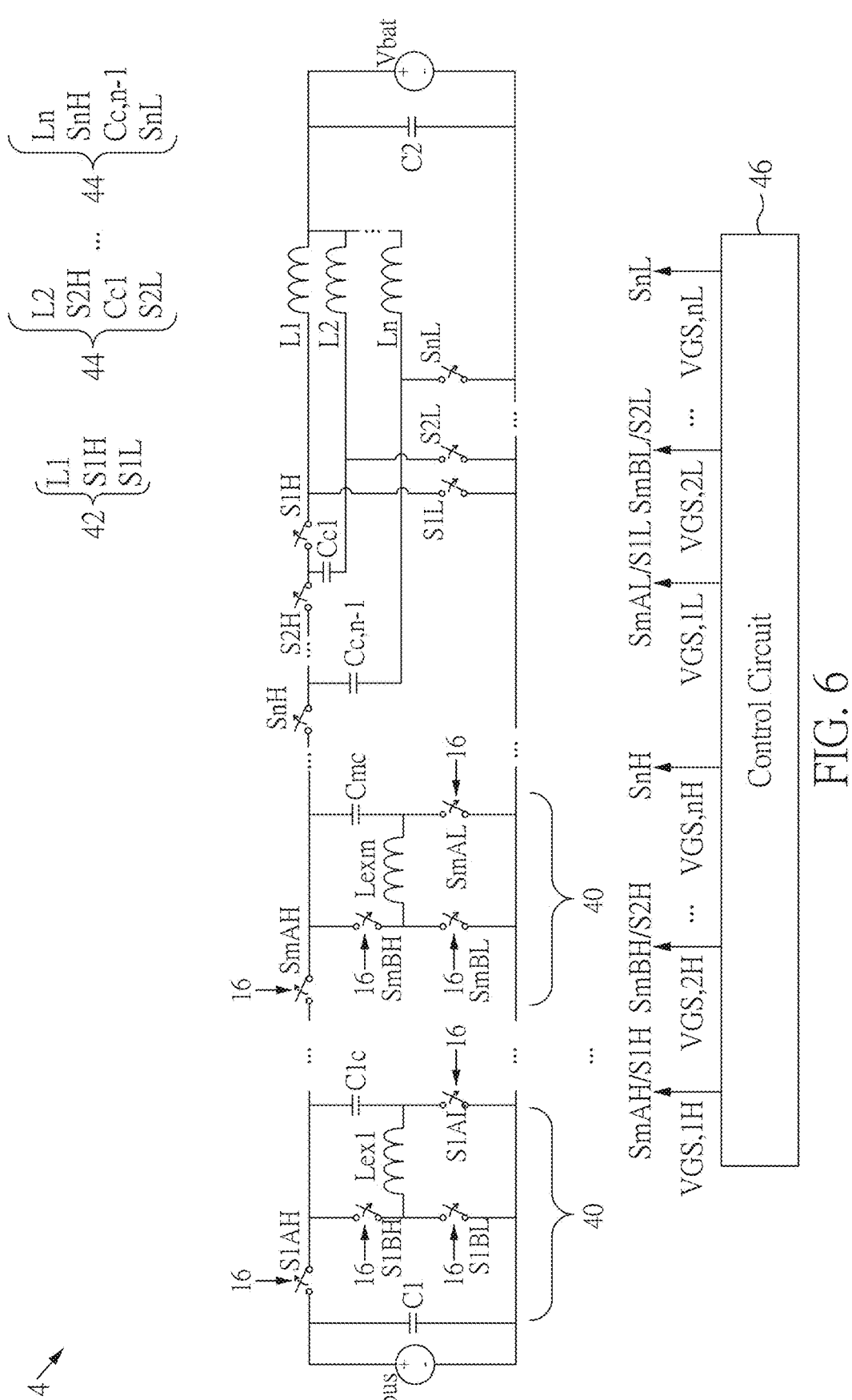
FIG. 6 is a circuit diagram of a bidirectional DC-DC power converter according to a fourth embodiment of the present disclosure.

FIG. 6 is a circuit diagram of a bidirectional DC-DC power converter according to a fourth embodiment of the present disclosure. Reference is made to FIG. 6, in which the third embodiment of the present disclosure provides a bidirectional DC-DC power converter 4 suitable for bidirectional power supply between the first voltage source Vbus and the second voltage source Vbat.

It should be noted that, the bidirectional DC-DC power converter 4 in FIG. 6 integrates the expandable versions of the second embodiment and the third embodiment. The bidirectional DC-DC bidirectional power converter 4 includes m first switching circuits 40, a second switching circuit 42, n−1 third switching circuits 44, and a control circuit 46.

Similar to FIG. 4, the first one of the m first switching circuits 20 includes high-side switches S1AH, S1BH, low-side switches S1BL, S1AL, a clamping capacitor C1c, and an inductor Lex1; and the last one of the m first switching circuits 20 includes high-side switches SmAH, SmBH, low-side switches SmBL, SmAL, a clamping capacitor Cmc, and an inductor Lexm.

Similar to FIG. 5, the first one of the n−1 third switching circuits 34 includes the inductor L2, the clamping capacitor Cc1, the high-side switch S2H, and the low-side switch S2L; and the last one of the n−1 third switching circuit 34 includes an inductor Ln, a clamping capacitor Ccn−1, a high-side switch SnH, and a low-side switch SnL.

It should be noted that, the second end of the high-side switch SmAH, the first end of the high-side switch SmBH, and the clamping capacitor Cmc are connected to the first end of the high-side switch SnH, while the second ends of the low-side switches S1BL, . . . , and SmBL, S1AL, . . . and SmAL, S1L, S2L, . . . , and SnL are connected to one another.

In this embodiment, the switch signals VGS,1H, VGS,2H, . . . , and VGS,nH are phase-shifted by 360/(phase number n), and are respectively used to control the high-side switches S1H, S2H, . . . , and SnH.

Furthermore, the low-side switches S1L, S2L, . . . , and SnL operate complementarily to the high-side switches S1H, S1H, . . . , and SnH respectively through the switch signals VGS,1L, VGS,2L, . . . , and VGS,nL.

In addition, the switch signals used by the high-side switches SmAH, SmBH and the low-side switches SmAL, SmBL in an m-th one of the first switching circuits 40 are the same as those used by the high-side switches S1H, S2H, S1L, and S2L, respectively, that is, switch signals VGS,1H, VGS,2H and switch signals VGS,1L, VGS,2L. In addition, similar to the second embodiment, the switch signals of the odd-numbered high-side switches SjAH and SjBH (j is from 1 to m) need to follow the switch signals of the even-numbered high-side switches SjBH and SjAH.

Therefore, average currents of the inductors L1, L2, . . . , and Ln can be expressed by the following equations:

$$I_{Lj} = \frac{I_{batt}}{(2^{m-j})n}, \; I_{Li} = \frac{I_{batt}}{n},$$

i=1 to n;
   voltages of the clamping capacitors C1c, . . . , and CmC and Cc1, . . . , and Cc,n−1 can be expressed by the following equations (average voltages):

$$V_{cic} = \frac{i}{n} V_{cmc}, \; V_{cmj} = \frac{V_{in}}{2j},$$

j=1 to m;
   a voltage gain of the bidirectional DC-DC bidirectional power converter 4 of the fourth embodiment can be expressed by the following equation:

$$\frac{V_{batt}}{V_{bus}} = \frac{D}{(2^m)n};$$

therefore, the bidirectional DC-DC bidirectional power converter 4 of the fourth embodiment can adjust the number of phases in the second embodiment and the number of stages in the third embodiment to be adapted to the requirements of load sharing among the phases and the voltage gain.

The fourth embodiment is a combination of the second embodiment and the third embodiment. In this way, the voltage stresses of the high-side switches S1H, S2H, . . . , and Sn,H and the low-side switches S1L, S2L, . . . , and SnL can be significantly reduced.

Specifically, the voltage stress of all switches can be represented by the following equations:

$$v_{i,H} = \left((V_{c,1} - V_{c,i-1})\overline{S_{i+1,H}} - (V_{c,i+1} - V_{c,i-1})S_{i+1,H}\right)\overline{S_{i,H}};$$

$$v_{i,L} = (V_{c,i} + V_{c,i-1})\overline{S_{i,L}};$$

$$v_{j,AH} = \left((V_{c,ex,j-1} - V_{c,ex,j})\overline{S_{j-1,AH}} + (V_{c,j-2} - V_{c,j})S_{i-1,AH}\right)\overline{S_{j,AH}};$$

$$v_{j,BH} = \left(V_{c,ex,j}\overline{S_{j,AH}} + V_{c,ex,j-1}S_{j,1H}\right)\overline{S_{j,BH}};$$

$$v_{j,AL} = (V_{c,ex,j-1} - V_{c,ex,j})\overline{S_{j,AL}};\ \text{and}$$

$$v_{j,BL} = V_{c,ex,j}\overline{S_{i,BL}};$$

where $\overline{S_x}$ or $S_x$ corresponds to 0 or 1, which indicates that the status of each of the switches is OFF or ON, respectively, x is a switch indicator, the status of $S_{1H,0}$ is 0, $V_{c,0}=0V$, $V_{c,n}=V_{c,ex,m}$, $V_{c,n+1}=V_{c,ex,m-1}$, $S_{n+1,H}=S_{1H}$, and $V_{c,ex,0}=V_{bus}$.

Beneficial Effects of the Embodiments

In conclusion, the bidirectional power converter provided by the present disclosure has high voltage gain and low voltage stress on switches, and is suitable for bidirectional high voltage gain applications due to the capacitive voltage division, such as energy storage systems (ESSs), on-board chargers (OBC), information and communication technology (ICT) devices, and data centers. Therefore, low voltage rating switches can be employed to reduce losses and cost.

Furthermore, the bidirectional power converter provided by the present disclosure can achieve automatic and uniform current sharing under the premise of employing the interleaved control method without adding extra components or complex control methods as in the conventional interleaved converters. In addition, an expandable version of the bidirectional power converter provided by the present disclosure can be implemented to extend a conversion ratio, which uses less control signals, has higher effective duty ratios, and uses less number of components comparing to expandable versions of other topologies.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A high voltage gain DC-DC bidirectional power converter with an automatic current sharing function, suitable for bidirectional power supply between a first voltage source and a second voltage source, the high voltage gain DC-DC bidirectional power converter comprising:

a first switching circuit including:
a first high-side switch, a second high-side switch, and a first low-side switch connected in series between a first end and a second end of the first voltage source;
a first clamping capacitor and a second low-side switch connected in series between the first high-side switch and the second end of the first voltage source; and
a first inductor having a first end connected between the second high-side switch and the first low-side switch, and a second end connected between the first clamping capacitor and the second low-side switch;

a second switching circuit including:
a second inductor and a third high-side switch connected in series between a first end of the second voltage source and the first switching circuit; and
a third low-side switch having a first end connected between the second inductor and the third high-side switch, and a second end connected to a second end of the second voltage source;

a third switching circuit including:
a third inductor, a second clamping capacitor, and a fourth high-side switch connected in series between the first end of the second voltage source and the first switching circuit, wherein the fourth high-side switch is further connected between the second switching circuit and the first switching circuit; and
a fourth low-side switch having a first end connected between the third inductor and the second clamping capacitor, and a second end connected to the second end of the second voltage source; and a control circuit configured to correspondingly control the first switching circuit, the second switching circuit, and the third switching circuit through a first switch signal, a second switch signal, a third switch signal, and a fourth switch signal, wherein the first high-side switch and the third high-side switch correspond to the first switch signal, the second high-side switch and the fourth high-side switch correspond to the second switch signal, the second low-side switch and the third low-side switch correspond to the third switch signal, the first low-side switch and the fourth low-side switch correspond to the fourth switch signal, the first switch signal and the second switch signal differ by a predetermined phase, the first switch signal and the second switch signal are complementary, and the second switch signal and the fourth switch signal are complementary.

2. The high voltage gain DC-DC bidirectional power converter according to claim 1, wherein, in a first mode, the control circuit is configured to control the first high-side switch and the third high-side switch to be turned on, the second high-side switch and the fourth high-side switch to be turned off, the second low-side switch and the third low-side switch to be turned off, and the first low-side switch and the fourth low-side switch to be turned on.

3. The high voltage gain DC-DC bidirectional power converter according to claim 2, wherein, in a second mode and a fourth mode, the control circuit is configured to control the first high-side switch and the third high-side switch to be turned off, the second high-side switch and the fourth high-side switch to be turned off, the second low-side switch and the third low-side switch to be turned on, and the first low-side switch and the fourth low-side switch to be turned on.

4. The high voltage gain DC-DC bidirectional power converter according to claim 3, wherein, in a third mode, the control circuit is configured to control the first high-side switch and the third high-side switch to be turned off, the second high-side switch and the fourth high-side switch to be turned on, the second low-side switch and the third low-side switch to be turned on, and the first low-side switch and the fourth low-side switch to be turned off.

5. The high voltage gain DC-DC bidirectional power converter according to claim 4, wherein the control circuit is configured to sequentially enter the first mode, the second mode, the third mode, and the fourth mode, and the prede-termined phase is 180 degrees.

6. The high voltage gain DC-DC bidirectional power converter according to claim 3, wherein inductor currents of the second inductor and the third inductor are equal to each other and are half of an inductor current of the first inductor.

7. A high voltage gain DC-DC bidirectional power con-verter with automatic current sharing function, suitable for bidirectional power supply between a first voltage source and a second voltage source, the high voltage gain DC-DC bidirectional power converter comprising:

m first switching circuits, each including:
  a first high-side switch, a second high-side switch, and a first low-side switch connected in series between a first node and a second end of the first voltage source;
  a first clamping capacitor and a second low-side switch connected in series between the first high-side switch and the second end of the first voltage source; and
  a first inductor having a first end connected between the second high-side switch and the first low-side switch, and a second end connected between the first clamping capacitor and the second low-side switch;

a second switching circuit including:
  a second inductor and a third high-side switch con-nected in series between a first end of the second voltage source and the first switching circuit; and
  a third low-side switch having a first end connected between the second inductor and the third high-side switch, and a second end connected to a second end of the second voltage source;

n−1 third switching circuits, each including:
  a third inductor, a second clamping capacitor, and a fourth high-side switch connected in series between the first end of the second voltage source and the first switching circuit, wherein the fourth high-side switch is further connected between the second switching circuit and the m first switching circuits; and
  a fourth low-side switch having a first end connected between the third inductor and the second clamping capacitor, and a second end connected to the second end of the second voltage source; and a control circuit configured to control:
  the first high-side switch and the third high-side switch of each of the m first switching circuits through m first switch signals;
  the second high-side switch of each of the m first switching circuits through m second switch signals;
  the first low-side switch of each of the m first switching circuits through m third switch signals;
  the first low-side switch of each of the m first switching circuits through m fourth switch signals;
  the third high-side switch and the fourth high-side switch of each of the n−1 third switching circuits through n fifth switch signals; and
  the third low-side switch and the fourth low-side switch of each of the n−1 third switching circuits through n sixth switch signals.

8. The high voltage gain DC-DC bidirectional power converter according to claim 7, wherein m is a positive integer greater than or equal to 1, n is an integer greater than or equal to 2, and the n fifth switch signals are phase-shifted by a predetermined phase and complementary to the n sixth switch signals, respectively.

9. The high voltage gain DC-DC bidirectional power converter according to claim 8, wherein the first high-side switch, the second high-side switch, the first low-side switch, and the second low-side switch of each of the m first switching circuits, the third high-side switch, the third low-side switch, the fourth high-side switch, and the fourth low-side switch of a first one of the n−1 third switching circuits are simultaneously turned on or off.

10. The high voltage gain DC-DC bidirectional power converter according to claim 9, wherein the first high-side switch and the second high-side switch of an i-th one of the m first switching circuits follow the second high-side switch and the first high-side switch of a j-th of the m first switching circuits to be turned on or off, i is an odd number of from 1 to m, and j is an even number of from 1 to m.

* * * * *